United States Patent [19]

McCloskey

[11] Patent Number: 5,235,727
[45] Date of Patent: Aug. 17, 1993

[54] ATTACHABLE CLIP FOR AN EYEGLASS FRAME AND METHOD FOR MAKING THE SAME

[76] Inventor: George McCloskey, 15 Old Litchfield Tpk., Oxford, Conn. 06478-1404

[21] Appl. No.: 872,724

[22] Filed: Apr. 22, 1992

[51] Int. Cl.⁵ ............................................. A44B 21/00
[52] U.S. Cl. ...................................... 24/3 C; 24/3 R; 24/3 J
[58] Field of Search .............. 24/3 C, 3 R, 3 J, 3 H, 24/3 E, 3 G, 3 D, 11 P, 336; 351/111, 112

[56] References Cited

U.S. PATENT DOCUMENTS

| | | | |
|---|---|---|---|
| 922,279 | 5/1909 | Heidingsfeld et al. | 24/336 |
| 1,618,698 | 2/1927 | Colon | 24/3 R |
| 1,863,016 | 6/1932 | Krause | 24/11 P |
| 1,898,059 | 2/1933 | McDonald | 24/3 J |
| 2,614,305 | 10/1952 | Yeardley | 24/3 H |
| 2,926,403 | 3/1960 | Weissman | 24/336 |
| 3,038,377 | 6/1962 | Maxson | 351/112 |
| 3,182,368 | 5/1965 | Fair | 24/3 J |
| 3,767,092 | 10/1973 | Garrison et al. | 24/336 |
| 4,903,375 | 2/1990 | DiFranco | 24/3 X |
| 4,949,432 | 8/1990 | Wisniewski | 24/3 C |

FOREIGN PATENT DOCUMENTS

| | | | |
|---|---|---|---|
| 2298445 | 9/1976 | France | 24/3 C |
| 0421551 | 3/1967 | Switzerland | 351/112 |
| 0398276 | 9/1933 | United Kingdom | 24/11 P |

Primary Examiner—Victor N. Sakran
Attorney, Agent, or Firm—John J. Daniels

[57] ABSTRACT

An attachable clip for an eyeglass frame stem. The attachable clip includes an arm member which has a first end and a second end. An attachment member is integrally attached to the first arm member and the attachment member defines a channel. The channel is effective for receiving and gripping onto a portion of an eyeglass frame stem. To enhance the gripping of the eyeglass frame stem, at least one gripping point or flap is formed along at least one longitudinal length of the channel and is effective for digging into and gripping an eyeglass frame stem which is disposed in the channel. The attachable clip may be formed from an elastically deformable material, such as a spring steel or other suitable material. The method of making the attachable clip for an eyeglass frame includes the steps of providing a substrate, stamping the substrate into a shape which has an arm member portion and an attachment member portion, punching each of the gripping points into the attachment member portion and bending the attachment member portion to form the channel. Also, the arm member portion may be formed to have an arc shape and a rounded tip disposed at the second end of the arm member.

11 Claims, 9 Drawing Sheets

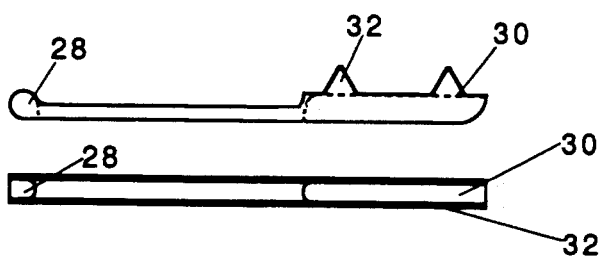
Figure 4(a)
Figure 4(b)
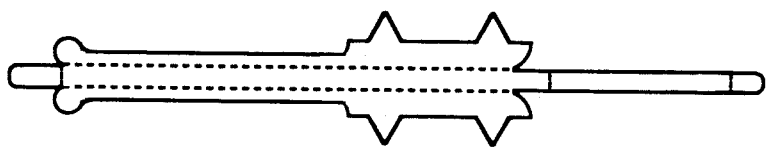
Figure 4(c)
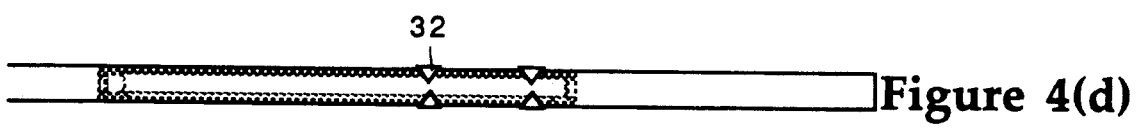
Figure 4(d)

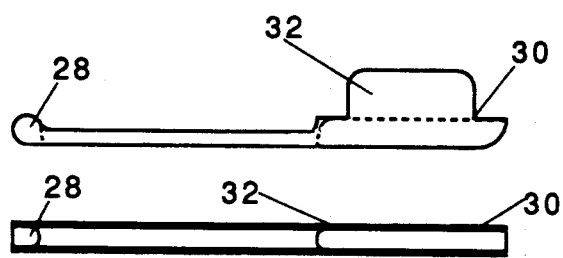
Figure 5(a)
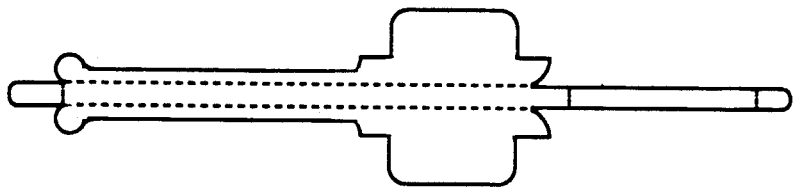
Figure 5(b)
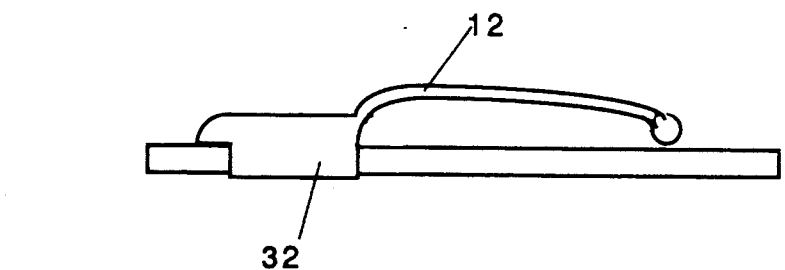
Figure 5(c)
Figure 5(d)

ATTACHABLE CLIP FOR AN EYEGLASS FRAME AND METHOD FOR MAKING THE SAME

BACKGROUND OF THE INVENTION

The present invention pertains to an attachable clip. More particularly, the present invention pertains to an attachable clip for an eyeglass frame, or the like.

Nearly everyone wears some form of eyeglasses. For example, many people wear prescription glasses to correct various vision problems. Also, many people wear sunglasses to combat the effects of glare from strong sunlight. In particular, pilots wear sunglasses when flying to protect their eyes from strong exposure to the sun's rays and to improve their vision. In the case of airplane pilots, sunglasses are particularly important piece of safety equipment. Thus, maintenance of a pilot's sunglasses is a major concern. Also, industry makes wide use of safety glasses to protect the wearer's eyes from physical harm.

However, there are often times when one removes the glasses from one's head. For example, reading glasses are effective for helping one to read but actually diminish vision if the wearer focuses on a distant object. The same is true for other forms of prescription glasses which are effective for correcting particular vision problems but are ineffective and diminish vision if used during an activity for which they are not designed. Also, in the case of sunglasses, the inherent light blocking properties of the darkened lenses makes the sunglasses ineffective and detrimental for use indoors or when the sun is not bright. Further, safety glasses are normally removed when exiting the actual production area of a factory.

Therefore, there are many times when a eyeglass wearer will remove the glasses from his head. During these times, the glasses must be placed in a safe location to prevent damage. Commonly, the glasses are placed in a case and carried around. However, this is inefficient because of the necessity for having the case present even at times when the glasses are being worn and the difficulties of carrying around both the case and the glasses.

More commonly, an eyeglass wearer will remove the glass from his head, fold them up and place them in a convenient location, such as a shirt pocket. A shirt pocket provides soft fabric protection for the lenses which will not scratch or mar the lens surface. Also, the shirt pocket is a functional aspect of the shirt being worn by the user and therefore does not necessitate the addition of, for example, an added carrying case. However, when the eyeglasses are placed in the shirt pocket they often fall out during times, for example, when the wearer bends over or walks briskly. In most cases, the eyeglasses can fall from the shirt pocket onto the ground and become damaged.

There have been attempts in the past to provide a means for securing eyeglasses to an article such as a shirt pocket. U.S. Pat. No. 3,210,814, issued to Wolf, discloses a resilient clip attachment for eyeglass temple bars.

However, this resilient detachable clip taught by Wolf is relatively complicated to manufacture due to the requirement of many complicated bending operations necessary for its manufacture. Also, the resilient clip taught by Wolf has limited adaptability for attachment to eyeglass frame stems of varying widths and thicknesses. Further, the detachable clip taught by Wolf is relatively difficult to attach to an eyeglass frame stem by a user.

U.S. Pat. No. 3,038,377, issued to Maxson, also teaches a clasp for use on the temple bars of eyeglasses. However, as with Wolf, the clasp taught by Maxson requires many complicated manufacturing procedures and cannot be fitted to existing frames.

Therefore, there is a need for an attachable clip for an eyeglass frame which requires relatively simple manufacturing procedures and which is effectively adaptable for varying widths and thicknesses of stems of the eyeglasses. Furthermore, it must be easy to install or remove by the user.

SUMMARY OF THE INVENTION

The present invention is intended to alleviate the drawbacks of the prior art. It is an object of the present invention to provide an attachable clip for an eyeglass frame which is easy to manufacture and which is adaptable for frames stems of varying widths and easily attached or removed. Another object of the present invention is to provide an attachable clip for an eyeglass frame which may be attached or detached without requiring the use of tools.

It is another object of the present invention to provide a method for manufacturing an attachable clip for an eyeglass frame which requires very few manufacturing steps and little or no assembly.

In accordance with the present invention, an attachable clip for an eyeglass frame is provided which includes an arm member which has a first end and a second end. An attachment member is integrally attached to the first end of the arm member and the attachment member defines a channel. The channel is effective for receiving and gripping onto a portion of an eyeglass frame stem. Grip enhancing means are provided for enhancing the grip of the attachment member on the portion of the eyeglass frame stem, whereby, the arm member is effective for clipping onto an item disposed between the arm member and the eyeglass frame stem.

In a preferred embodiment of the present invention, the grip enhancing means includes a plurality of longitudinally spaced gripping flaps formed along at least one longitudinal length of the channel. These gripping flaps are effective for gripping and securing into an eyeglass frame stem disposed in the channel. Also, in the preferred embodiment, the attachable clip is formed from an elastically deformable material, such as a spring steel, stainless steel, or other metal, polymer, or the like.

The inventive method for making the attachable clip for an eyeglass frame includes the steps of providing a suitable substrate, such as spring steel, etc., stamping the substrate into a shape having an arm member portion and an attachment member portion, and punching (in the preferred embodiment) each gripping flap into the attachment member portion. Finally, the attachment member portion is bent to form the channel for receiving a portion of the eyeglass frame stem. Also, preferably during the bending operation, the attachment member portion is bent so as to form the channel to have inwardly biased sides. Thus, the spring nature of the attachment member will enhance the gripping properties of the attachment member on the eyeglass frame stem and urge the edges of the gripping flaps into the material of the eyeglass frame stem to further secure the attachment.

The arm member portion may be formed so as to have an arc shape to thereby enhance the gripping action on an article such as a shirt pocket, disposed between the arm member portion and the eyeglass frame stem.

In another embodiment of the invention, the grip enhancing means includes a plurality of gripping teeth which are formed along at least one longitudinal edge of the channel and are oriented so as to be effective for gripping the eyeglass frame stem disposed in the channel.

In another embodiment of the invention, the attachment member has a contacting area for contacting with a portion of the eyeglass frame stem and further includes at least one bendably deformable attachment member which is effective to be bendable over the portion of the eyeglass frame stem and maintain contact between the contacting area and the contacted portion of the eyeglass frame stem. Thus, the arm member is positioned to be effective to clip onto an article disposed between the arm member and the eyeglass frame stem.

In yet another embodiment of the present invention, the attachment member has a receiving opening for receiving an end of the eyeglass frame stem so as to slideably engage the attachment member on the eyeglass frame stem to position the arm member at a location effective for clipping onto an item disposed between the arm member and the eyeglass frame stem. In this embodiment, the attachment member includes a base and a pair of opposing members which extend from opposite sides of the base so as to define the receiving opening between the base and the pair of opposing members.

BRIEF DESCRIPTION OF THE DRAWINGS

FIG. 4(a) is a side view of an alternative embodiment of the inventive attachable clip for a wire type (metal) eyeglass frame, which may be as narrow as ⅛ inch and 1/16 thick;

FIG. 4(b) is a bottom plan view of the embodiment shown in FIG. 4(a);

FIG. 4(c) is a top plan view of a stamped blank for forming the alternative embodiment of the inventive attachable clip for an eyeglass frame shown in FIGS. 4(a) and 4(b);

FIG. 4(d) is a bottom plan view showing the embodiment of the inventive attachable clip for an eyeglass frame shown in FIGS. 4(a) through 4(c) shown in use attached to an eyeglass frame;

FIG. 5(a) is a side view of another embodiment of the inventive attachable clip for a wire type (metal) eyeglass frame;

FIG. 5(b) is a bottom plan view of the embodiment of the inventive attachable clip for an eyeglass frame shown in FIG. 5(a);

FIG. 5(c) is a top plan view of a stamped blank for forming the embodiment of the inventive attachable clip for an eyeglass frame shown in FIGS. 5(a) and 5(b);

FIG. 5(d) is a side view of the embodiment of the inventive attachable clip for an eyeglass frame shown in FIGS. 5(a) through 5(c) shown in use attached to an eyeglass frame;

DETAILED DESCRIPTION OF THE INVENTION

Figure 1A:
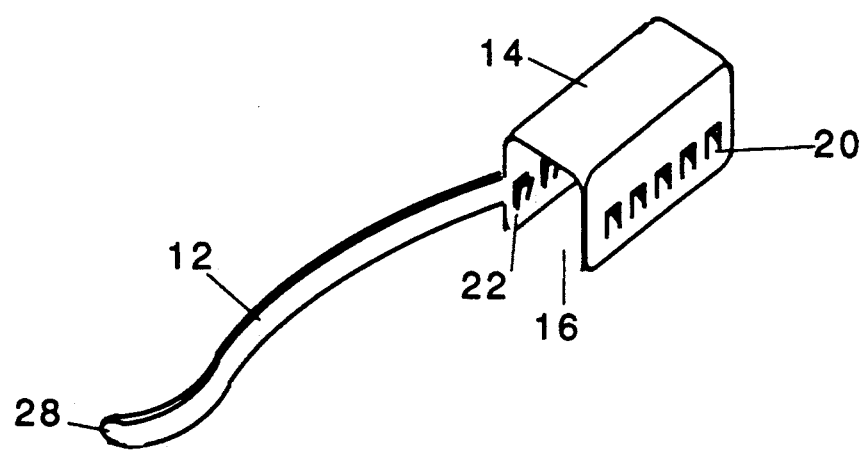
FIG. 1(a) is a perspective view of a preferred embodiment of the inventive attachable clip.

For purposes of promoting an understanding of the principles of the invention, reference will now be made to the embodiments illustrated in the drawings and specific language will be used to describe the same. It will nevertheless be understood that no limitation of the scope of the invention is thereby intended, there being contemplated such alterations and modifications of the illustrated device, and such further applications of the principles of the invention as disclosed herein, as would normally occur to one skilled in the art to which the invention pertains.

Referring to FIG. 1(a), a perspective view of a preferred embodiment of the inventive attachable clip 10 for an eyeglass frame is shown. In this preferred embodiment, the inventive attachable clip 10 for an eyeglass frame comprises an arm member 12 which has a first end and a second end. An attachment member 14 is integrally attached to the first end of the arm member 12. The attachment member 14 defines a channel 16 which is effective for receiving and gripping onto a portion of an eyeglass frame stem 18 (shown in FIG. 3(a)). Grip enhancing means 20 are provided for enhancing the grip of the attachment member 14 on the portion of the eyeglass frame stem 18. In this embodiment, the grip enhancing means 20 includes a plurality of longitudinally spaced gripping flaps 22 formed along two sides of the channel 16 defined by the attachment member 14. In use, these gripping flaps 22 are effective for preventing the inventive clip 10 from being removed from the eyeglass frame stem 18 so as to firmly attach the inventive attachable clip 10 on the eyeglass frame stem 18. Preferably, the attachment member 14 is comprised of an elastically deformable material such as a spring steel, stainless steel, or another metal or other suitable material.

Figure 1B:
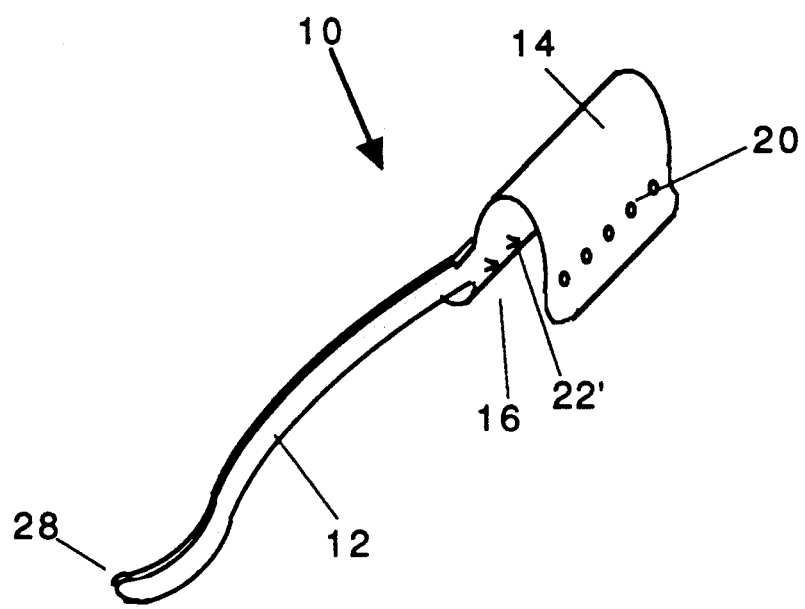
FIG. 1(b) is a perspective view of another embodiment of the inventive attachable clip.

Referring to FIG. 1(b), an alternative embodiment of the grip enhancing means 20 is shown. In this embodiment, the grip enhancing means 20 includes a plurality of longitudinally spaced gripping points 22'.

Figure 2A:
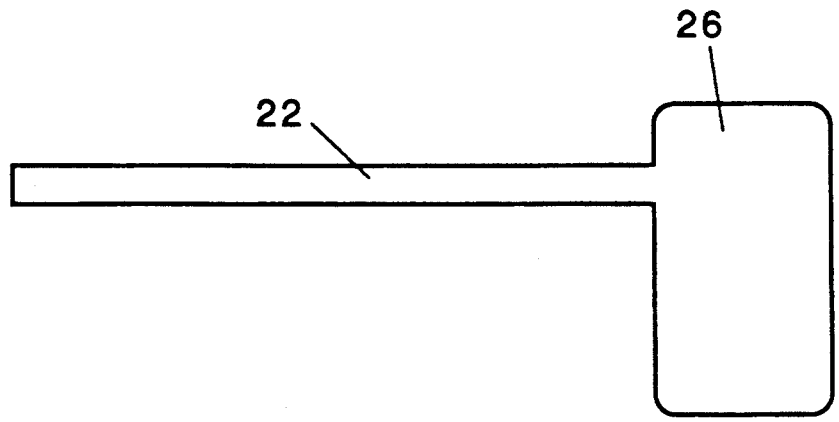
FIG. 2(a) is a top plan view of a stamped blank for forming the preferred embodiment shown in FIG. 1(a)
Figure 2B:
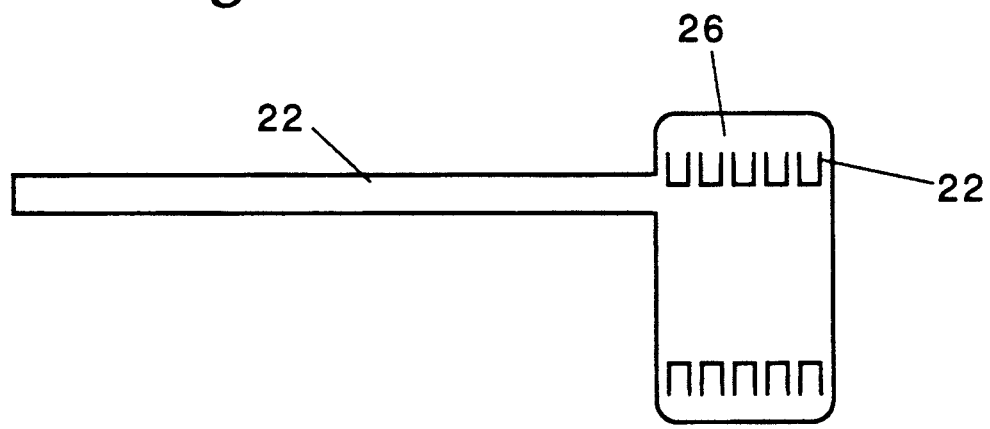
FIG. 2(b) is a top plan view of the stamped blank shown in FIG. 2(a) showing the formation of gripping flaps.
Figure 2C:
FIG. 2(c) is an isolated view of the formed gripping flaps of the preferred embodiment shown in FIG. 1(a)

Referring to FIGS. 2(a) through 2(c), the inventive method for making the attachable clip for an eyeglass frame comprises the steps of first providing a substrate. This substrate is preferably an elastically deformable metal. The substrate is stamped into a shape which has an arm member portion 24 and an attachment member portion 26. As shown in FIG. 2(b), each of the gripping flaps 22 (or in the the embodiment shown in FIG. 1(b), gripping points 22') of the grip enhancing means 20 are punched into the attachment member portion 26, preferably while the stamped blank is flat. Next, the attachment member portion 26 is bent to form the channel 16 (substantially the shape shown in FIG. 1(a)). Furthermore, the arm member portion 24 may be bent at its second end to provide a smooth tip 28 (shown in FIG. 1(a)) to prevent the arm member 12 from becoming snagged on material such as a shirt pocket, during use. Also, the arm member 12 may be bent in an arc to enhance the spring action of the arm member 12 to thereby increase the gripping power on an item, such as a shirt pocket, disposed between the arm member 12 and an eyeglass frame stem 18 during use.

Figure 3A:
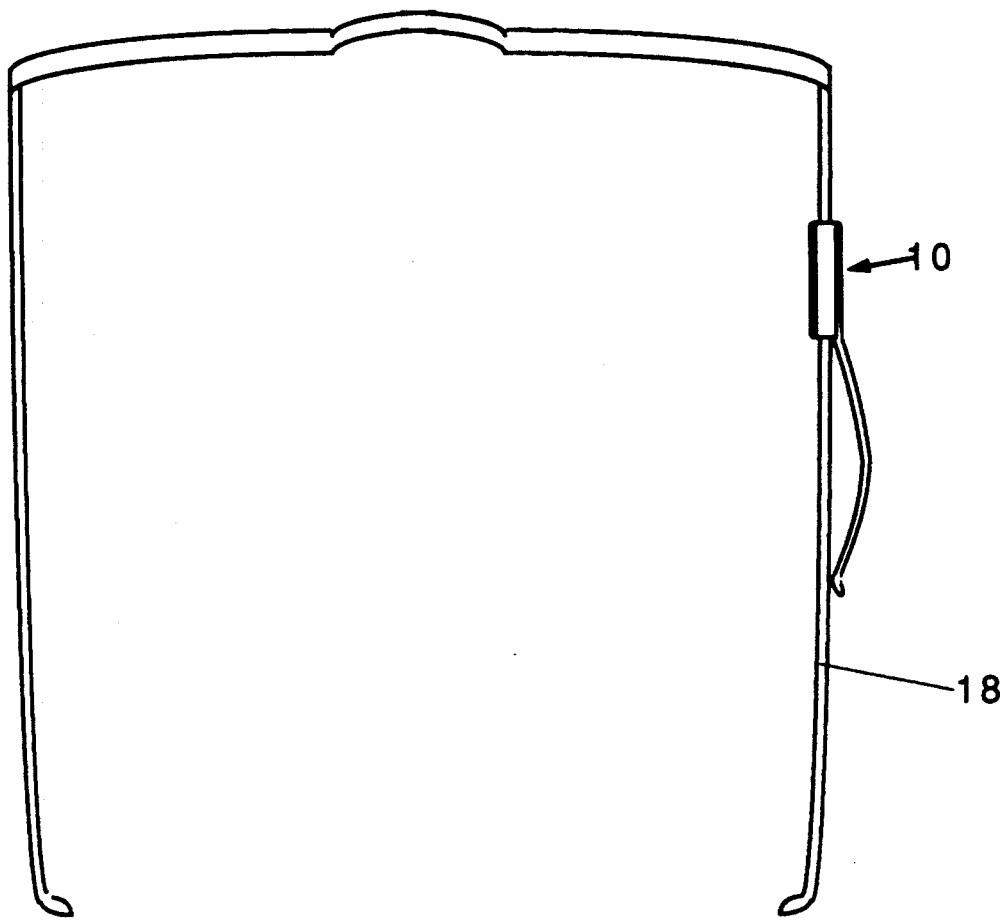
FIG. 3(a) is a top plan view showing the preferred embodiment of the inventive attachable clip for an eyeglass frame shown in use on an eyeglass frame stem.
Figure 3B:
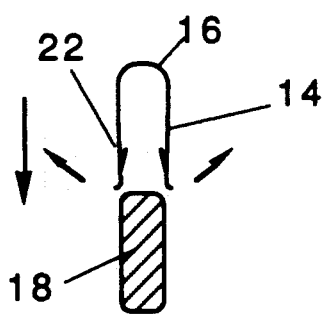
FIG. 3(b) is a cross sectional view showing the attachment of the inventive attachable clip on an eyeglass frame stem just prior to attachment.
Figure 3C:
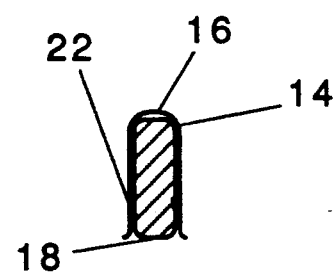
FIG. 3(c) is a cross sectional view showing attachment of the inventive attachable clip on an eyeglass frame after attachment.

Referring to FIG. 3(a), a top plan view of the inventive attachable clip 10 for an eyeglass frame is shown in use attached on an eyeglass frame stem 18. The inventive attachable clip 10 for an eyeglass frame may be easily attached to an eyeglass frame stem 18 as shown in FIGS. 3(b) through 3(c). In FIG. 3(b), a cross section of the attachment member 14 is shown just prior to being attached on a cross section of the eyeglass frame stem 18. In this case, the attachment member 14 is formed so that the channel 16 has inwardly biased sides. These inwardly biased sides, in conjunction with the spring nature of the metal forming the attachment member 14, provide a secure grip on the eyeglass frame stem 18. As the attachment member 14 is pushed onto the eyeglass frame stem 18, the thickness of the eyeglass frame stem 18 causes the inwardly biased sides to be urged outwards in the direction of the arrows. However, the spring nature of the attachment member 14 material urges the sides back in towards the center of the eyeglass frame stem 18. Thus, the gripping flaps 22 are biased to prevent movement of the inventive clip 10 in a direction of disattachment and contact the material of the eyeglass frame stem 18 to reliably and securely attach the inventive attachable clip 10 to the eyeglass frame as shown in FIG. 3(c). However, should the user wish to detach the inventive clip 10 from the eyeglass frame stem 18, a stiff flat object, such as a credit card, may be used to depress the gripping flaps 22 and allow the clip 10 to be removed without damage to the eyeglass frame stem 18.

FIGS. 4(a) through 4(d) show an alternative embodiment of the inventive attachable clip 10 for an eyeglass frame. In this embodiment, the inventive attachable clip 10 may be formed with a spacer portion 30 which maintains the attachment portion at a relative position to the eyeglass frame stem 18 so that the contacting area of the ball tip 28 portion is in the same plane as the contacting portion of the attachment member 14 so as to maintain a substantially parallel relationship between the arm member 12 and the eyeglass frame stem 18. Thus, material, such as a shirt pocket, may be received within a gap formed between the arm member 12 and the eyeglass frame stem 18 while the ball tip 28 provides adequate pressure and contact area to prevent the eyeglasses from slipping out of the pocket. In this embodiment, the attachment member 14 has a contacting area formed by the spacer portion 30 which contacts with a portion of the eyeglass frame stem 18.

At least one bendably deformable attaching member 32 is provided which is effective to be bendable over the portion of the eyeglass frame stem 18 (as shown in FIG. 4(d)) so as to maintain contact between the contacting area and the contacted portion of the eyeglass frame stem 18. Thereby, the arm member 12 is positioned relative to the eyeglass frame stem 18 to be effective for clipping onto an item disposed between the arm member 12 and the eyeglass frame stem 18.

Referring to FIGS. 5(a) through 5(d), another embodiment similar to the embodiment shown in FIGS. 4(a) through 4(d) is shown. This embodiment is substantially the same, however, the bendably deformable attaching member 32 in this embodiment has a relatively longer and wider shape than the bendably deformable attaching members shown in the FIG. 4 embodiment. Thus, this bendably deformable attaching member provides more surface contacting area and is effective for use when attaching the inventive attachable clip 10 to eyeglass frames having relatively thick stem width. Furthermore, as shown in FIG. 5(d), the arm member 12 is formed with an arcing shape so as enhance the spring action of the tip 28 against an item disposed between the tip 28 and the eyeglass frame stem 18. Note, this arcing arm member 12 may be provided with any of the embodiments disclosed herein.

Referring to FIGS. 6(a) through 6(f), still another alternative embodiment of the inventive attachable clip 10 for an eyeglass frame is shown. In this embodiment, an arm member 12 is provided having a first end and a second end. An attachment member 14 is integrally attached to the first end of the arm member 12 and the attachment member 14 defines a channel 16. The channel 16 is effective for receiving and gripping onto a portion of an eyeglass frame stem 18. Grip-enhancing means 20 are provided for enhancing the grip of the attachment member 14 on the portion of the eyeglass frame stem 18, whereby, the arm member 12 is effective for clipping onto an item disposed between the arm member 12 and the eyeglass frame stem 18.

In this embodiment, the grip enhancing means 20 comprises a plurality of gripping teeth 34 which are formed along at least one longitudinal edge of the opening of the channel 16 and are effective for gripping an eyeglass frame stem 18 which is disposed in the channel 16. The inventive method for making this embodiment of the inventive attachable clip 10 for an eyeglass frame includes the steps of providing a suitable substrate, such as an elastically deformable material, for example, a spring steel, stainless steel, or other metal, or the like. The substrate is then stamped into a shape which has an arm member portion 24 and an attachment member portion 26 (shown in FIG. 6(b)). Also, as shown in FIG.

Figure 6A:
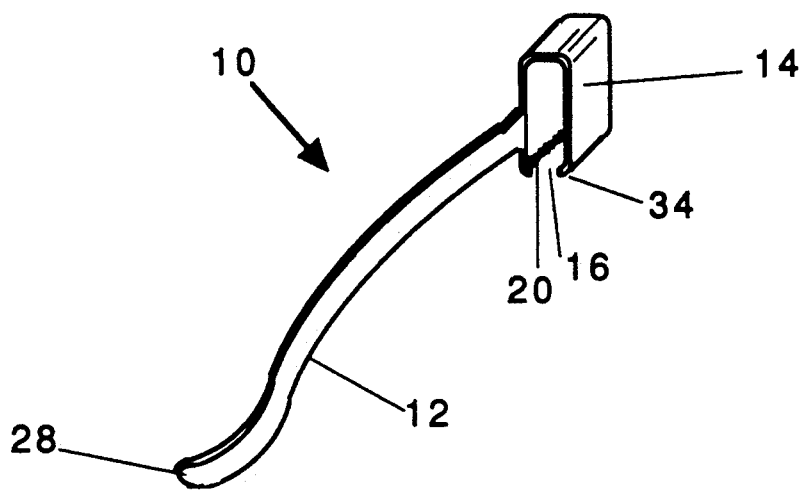
FIG. 6(a) is a perspective view of yet another embodiment of the inventive attachable clip for an extra wide plastic or nylon eyeglass frame.
Figure 6B:
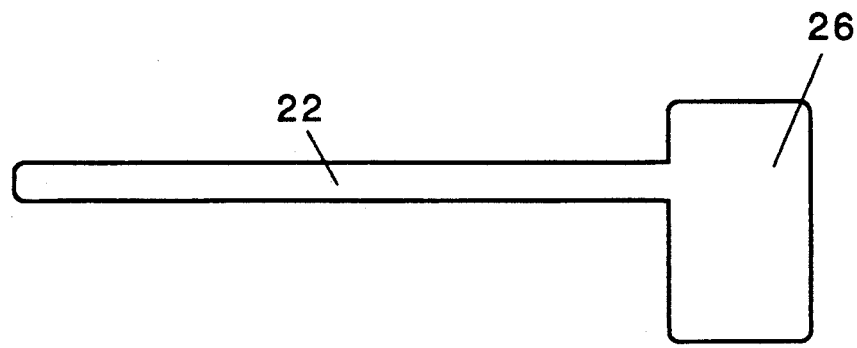
FIG. 6(b) is a top plan view of a stamped blank for forming the embodiment shown in FIG. 6(a) of the inventive attachable clip for an eyeglass frame.
Figure 6C:
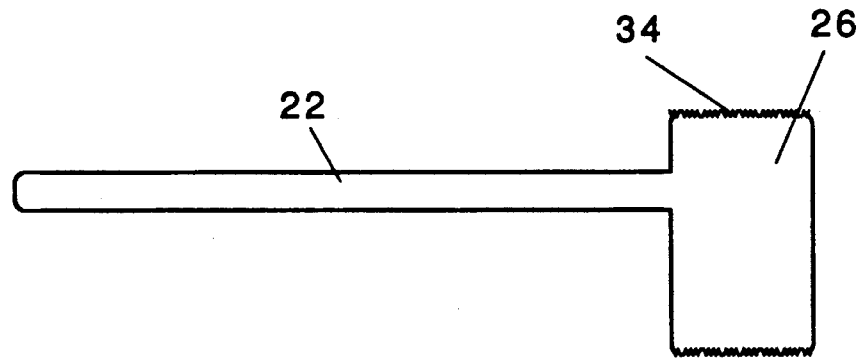
FIG. 6(c) is a top plan view of the stamped blank shown in FIG. 6(b) showing the formation of gripping teeth.

6(c), during this stamping of the substrate, or in a subsequent process, the plurality of gripping teeth 34 are formed at the appropriate edges of the attachment member portion 26. Next, the attachment member portion 26 is bent to form the channel 16 so that the plurality of gripping teeth 34 are oriented so as to be effective for gripping an eyeglass frame stem 18 disposed in the channel 16 (as shown in FIG. 6(a)). Also, the arm member portion 24 may be bent to form an arc and a rounded tip 28 as shown in the previous embodiments.

Figure 6D:
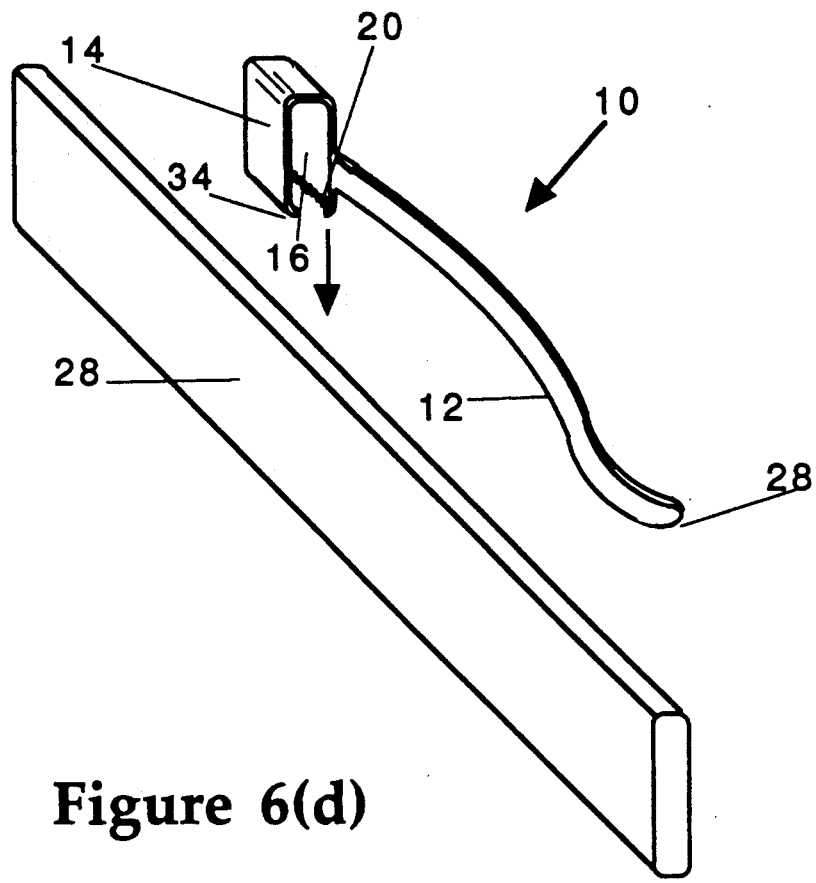
FIG. 6(d) is a perspective view showing the attachment of the embodiment of the inventive attachable clip for an eyeglass frame shown in FIG. 6(a) prior to attachment on an eyeglass frame stem.
Figure 6E:
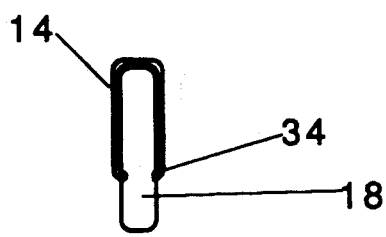
FIG. 6(e) is a cross-sectional view showing the attachment of the embodiment of the inventive attachable clip for an eyeglass frame shown in FIGS. 6(a) attached to an extra wide eyeglass frame stem.
Figure 6F:
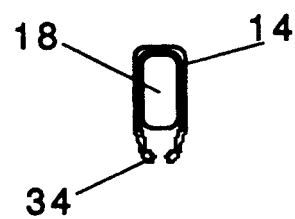
FIG. 6(f) is a cross-sectional view of the embodiment of the inventive attachable clip for an eyeglass frame shown in FIG. 6(a) shown attached to a narrower eyeglass frame stem.

FIGS. 6(d) through 6(f) show this embodiment of the inventive attachable clip 10 in use. As shown in FIG. 6(d), the opening of the channel 16 is disposed over an edge of an eyeglass frame stem 18 and the attachment member 14 is pushed down onto the eyeglass frame stem 18. As shown in FIG. 6(e), if the eyeglass frame stem 18 has a width which is longer than the length of the channel 16, the gripping teeth 34 are effective to dig into and grip onto the sides of the eyeglass frame stem 18 to thereby securely attach the clip to the stem. However, as shown in FIG. 6(f), if the width of the eyeglass frame stem 18 is narrower than the width of the channel 16, then the sides of the channel 16 may be bent inwards to securely hold the attachable clip on the eyeglass frame stem 18. Also, the sides of the channel 16 may be formed with an inward bias so that the gripping teeth 34, in the case of the long stem shown in FIG. 6(e), are urged inward to dig into and grip the eyeglass frame stem 18 or in the case of the eyeglass frame stem 18 shown in FIG. 6(f) the spring action of the attachment member 14 securely grips the stem against the sides of the channel 16.

Figure 7:
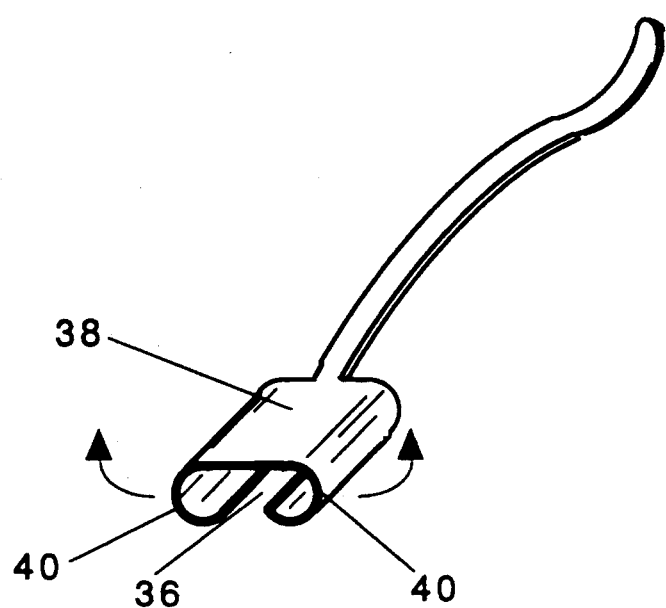
FIG. 7 is a perspective view of still another embodiment of the inventive attachable clip for an eyeglass frame.

Referring now to FIG. 7, yet another alternative embodiment of the inventive attachable clip 10 for an eyeglass frame is shown. In this embodiment, an arm member 12 is provided having a first end and a second end. An attachment member 14 is integrally attached to the first end of the arm member 12. The attachment member 14 has a receiving opening 36 for receiving an end of an eyeglass frame stem 18 so as to slideably engage the attachment member 14 on the eyeglass frame stem 18. In other words, the terminating end of the eyeglass frame stem 18 enters into the receiving opening 36 and the inventive attachable clip 10 is slid down the length of the eyeglass frame stem 18 to a suitable position. Whereby, the arm member 12 is effective for clipping onto an item which is disposed between the arm member 12 and the eyeglass frame stem 18. As shown in FIG. 7, the attachment member 14 comprises a base portion 38 and a pair of opposing members 40 which extend from opposite sides of the base portion 38 so as to define the receiving opening 36 between the base portion 38 and the pair of opposing members 40. In this embodiment, the opposing members 40 are formed in a semi-circular fashion to facilitate the springing action as the inventive attachable clip 10 is slid down an eyeglass frame stem 18 having a varying width.

The inventive method for making the attachable clip shown in FIG. 7 includes the steps of providing a metal substrate and stamping the substrate into a shape having an arm member portion 24 and an attachment member portion 26. Next, the attachment member portion 26 is bent to form the base and the pair of opposing members 40 extending from opposite sides of the base so as to define the receiving opening 36 between the base and the pair of opposing members 40.

With respect to the above description, it is realized that the optimum dimensional relationships for parts of the invention, including variations in size, materials, shape, form, function, and manner of operation, assembly and use, are deemed readily apparent and obvious to one skilled in the art. All equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described. Accordingly, all suitable modifications and equivalents may be resorted to, falling within the scope of the invention.

I claim:

1. An attachable clip for an eyeglass frame, comprising: an arm member having a first end and a second end; an attachment member integrally attached perpendicular to the first end of the arm member, the attachment member having a first side and a second side and a base defining a channel therebetween effective for receiving and gripping onto a portion of an eyeglass frame stem; and grip enhancing means for enhancing the grip of the attachment member on the portion of the eyeglass frame stem, the grip enhancing means comprising at least one flap member integrally formed with and disposed longitudinally along at least one of the sides, each flap member fixed to the side so as to extend inward toward the channel from a point of fixation and effective to retract toward the side to receive the portion of the eyeglass frame, each flap member further having a spring force effective to urge a top edge of the flap member against the portion and oriented so as to prevent the received portion from dislodging from the channel; whereby the arm member is effective for clipping onto an item disposed between the arm member and the eyeglass frame stem.

2. An attachable clip for an eyeglass frame according to claim 1, wherein the attachment member comprises an elastically deformable material.

3. An attachable clip for an eyeglass frame stem according to claim 1; wherein the grip enhancing means comprises a plurality of gripping teeth 34 formed along at least one longitudinal edge of the opening and effective for gripping an eyeglass frame stem disposed in the channel.

4. An attachable clip for an eyeglass frame according to claim 3; wherein the attachment member comprises an elastically deformable material.

5. An attachable clip for an eyeglass frame according to claim 1; wherein the top edge of each flap extends toward the base of the attachment member and is effective to dig into the surface of the received portion if the received portion is urged in a dislodging direction.

6. An attachable clip for an eyeglass frame according to claim 1; wherein the top edge of each flap is pointed.

7. An attachable clip for an eyeglass frame according to claim 1; wherein the sides of the attachment member inwardly biased so as to extend inwards from the base towards a center of the channel and have a spring force effective to urge the sides towards the received portion of the eyeglass frame.

8. An attachable clip for an eyeglass frame, comprising: an arm member having a first end and a second end; and an attachment member integrally attached perpendicular to the first end of the arm member, the attachment member having a contacting area for contacting with a first side of a portion of the eyeglass frame stem and at least one bendably deformable attaching member effective to be bendable around the portion of the eyeglass frame stem and come into engaging contact with a second side of the portion opposing the first side so as to grip the portion between the bendably deformable attaching member and the contacting area to maintain contact between the contacting area and the contacted portion of the eyeglass frame stem; whereby the arm member is effective for clipping onto an item disposed between the arm member and the eyeglass frame stem.

9. An attachable clip for an eyeglass frame according to claim 8; wherein the attachment member comprises a metal, and each said bendably deformable attaching member comprises a sheet member integrally formed with the attachment member.

10. An attachable clip for an eyeglass frame according to claim 9; wherein each said sheet member has a triangular shape.

11. An attachable clip for an eyeglass frame according to claim 9; wherein each said sheet member has a rectangular shape.

* * * * *